Figure 1:
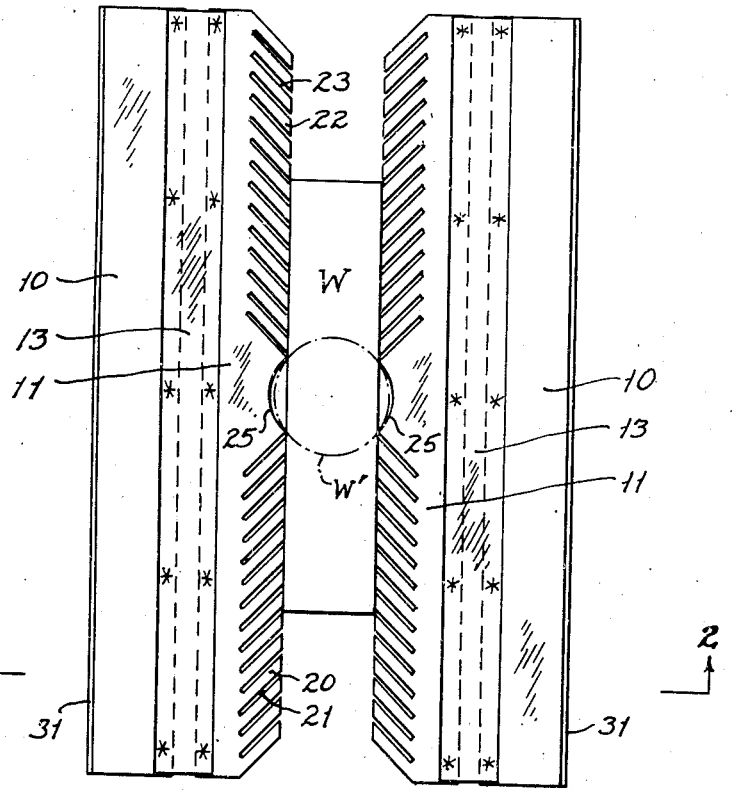

July 26, 1949.

J. E. GILES ET AL 2,477,297

CLAMPING DEVICE

Filed March 12, 1946

2 Sheets-Sheet 1

INVENTORS
John E. Giles & Peter V. Reynolds
BY
Bates, Teare, & McBean
ATTORNEYS

July 26, 1949.   J. E. GILES ET AL   2,477,297
CLAMPING DEVICE

Filed March 12, 1946   2 Sheets-Sheet 2

INVENTORS
John E. Giles & Peter V. Reynolds
BY
Bates, Teare, & McBean
ATTORNEYS

Patented July 26, 1949

2,477,297

UNITED STATES PATENT OFFICE 2,477,297

CLAMPING DEVICE

John E. Giles, Diablo Heights, and Peter V. Reynolds, Balboa, C. Z.

Application March 12, 1946, Serial No. 653,888

10 Claims. (Cl. 90—59)

This invention relates to clamping devices and particularly to clamps for holding non-magnetic workpieces on magnetic chucks of machine tools.

Since many of the present day machine tools are provided with magnetic chucks as the sole means for holding a workpiece, the machinist is frequently faced with the problem of clamping bronze or other non-magnetic articles thereon. In holding such workpieces, the usual method is to employ scrap blocks of steel which are pressed firmly around the workpiece and are relied upon to hold the latter in place when the magnetic chuck is energized.

In a machine tool, such as a surface grinder for example, powerful forces are brought to bear upon the workpiece and tend to move it when contact with the cutting tool is made. The greater the depth of material which is machined from the workpiece at one time, the greater is the tendency to move it and to throw it from the chuck. Since the blocking of the workpiece must be done at a level lower than the machined surface, to avoid interference with the tool, very thin blocking pieces must be used in the case of thin work, and the insufficient extent of contact thus obtained provides inadequate holding power. Furthermore, the type of contact is such that the holding is in a lateral direction only and no vertical force is obtained to maintain the workpiece against the chuck surface for accuracy in machining.

The limitation as to height imposed by a thin workpiece also rules out other expediencies which are resorted to with more or less success when machining thick workpieces.

Thus, in the past the machinist has had to be satisfied with inadequate holding of thin non-magnetic work and has, therefore, had to make many extremely light passes with the tool to avoid the inaccuracy and the danger caused by heavy cuts on a loosely held workpiece.

An object of the present invention is to provide a clamping device which will hold a thin non-magnetic workpiece on a magnetic chuck with accuracy and safety and, at the same time, avoid any interference with the cutting tool.

Another object is to provide a device for this purpose which is simple and economical in manufacture and which may be simply and easily used by the machinist.

These and other objects which will be apparent from the description and the claims, we accomplish by utilizing the principle of the toggle. Our invention comprises chiefly the provision of a steel plate which is slanted upwardly against the workpiece. When the magnetic chuck is energized and the outer edge of the plate is prevented from shifting, the plate, in being forcibly drawn to a more nearly horizontal position by the magnet, exerts a powerful lateral thrust against the workpiece to clamp it against a suitable abutment. Also, the firm frictional engagement of the plate with the workpiece allows the downward force upon the plate to be transmitted to the workpiece to hold the latter securely and accurately in place against the chuck.

Figure 2:
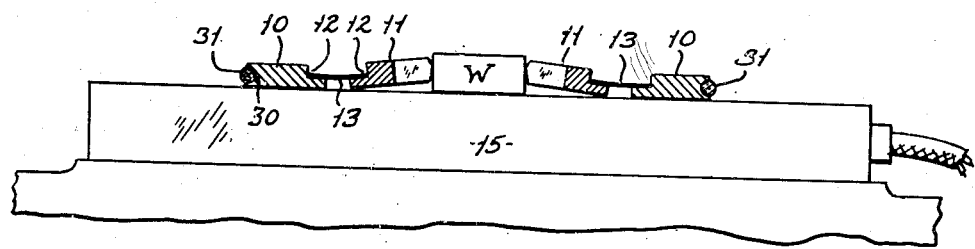
Figure 3:
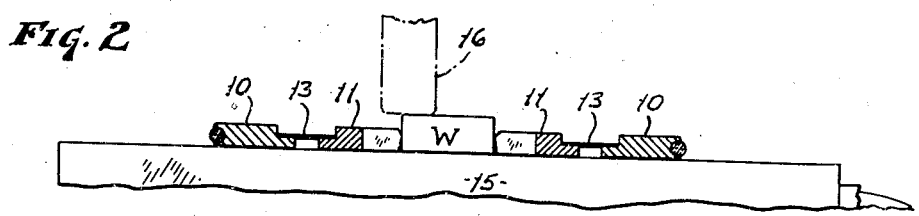
Figure 4:
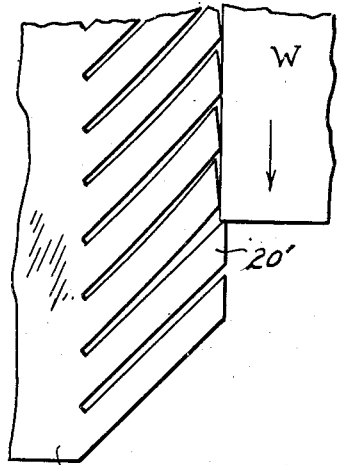
Figure 5:
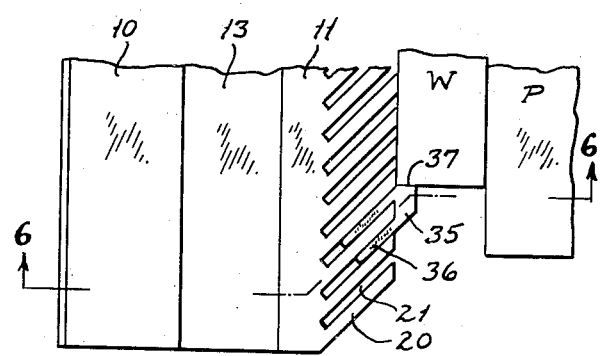
Figure 6:
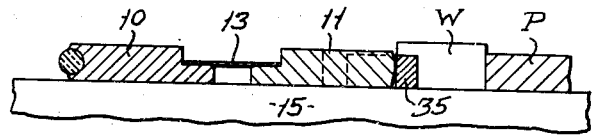
Figure 8:
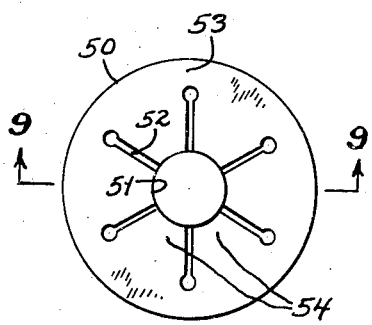
Figure 7:
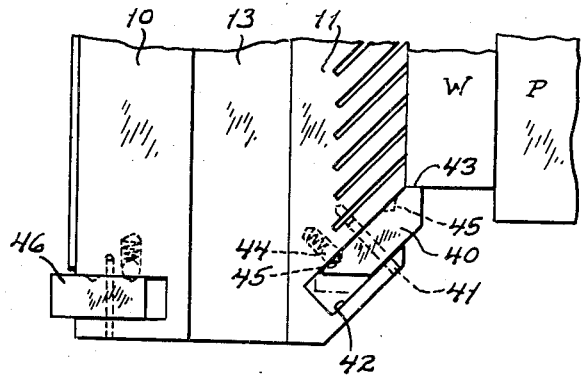
Figure 9:
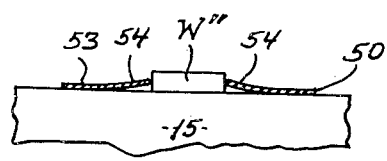

In the drawings, Fig. 1 is a plan view of two of our clamps engaging opposite sides of a workpiece; Fig. 2 is a transverse section taken on the line 2—2 of Fig. 1 and illustrating, in addition, the coacting chuck; Fig. 3 is a view similar to Fig. 2, but showing the parts in a subsequent and different position; Fig. 4 is an enlarged fragmentary view of a portion of Fig. 1; Fig. 5 is a fragmentary plan view of an additional member of our device; Fig. 6 is a transverse section taken on the line 6—6 of Fig. 5; Fig. 7 is a fragmentary plan view of a modified form of clamp; Fig. 8 is a plan view of another modified form of clamp, and Fig. 9 is a transverse section taken on the line 9—9 of Fig. 8.

In the drawings we have illustrated in Figs. 1 to 3, a preferred form of clamp embodying our invention. Although one of such clamps could be used to hold the workpiece against a fixed abutment on the chuck or against a plain steel blocking piece, such as the plate P in Fig. 5, we prefer to use two opposing clamps as illustrated in Figs. 1, 2 and 3.

Each clamp comprises two steel plates and an inter-connecting hinge. The plate 10 ordinarily serves as the anchoring member, by being securely held by the magnetic chuck, while the plate 11 serves as the work-engaging member. The function of the two plates may be interchanged, however, to adapt the device to different kinds of workpieces.

The hinge between the plates preferably comprises a thin strip of spring stock securely fastened to the plates by any appropriate means. As illustrated in the drawings, the plates may be rabbeted, as at 12, and the strip 13 then spot welded on the shoulders so formed. It is desirable, but not essential, that the strip lies in the central planes of the plates, as illustrated.

The strip 13 is bent slightly in a transverse direction throughout its length so that the relative position of the plates in the unstressed condition of the clamp is substantially as shown in Fig. 2. Thus when the plate 10 is laid flat upon the chuck 15, the plate 11 arises at a slight angle to the latter. With the magnetic chuck de-energized, two of such clamps may then be slid into contact with the workpiece W, as illustrated in Fig. 2, to locate the workpiece in proper tool-engaging position upon the chuck.

When the chuck is energized, powerful forces are brought, by the clamps, to bear upon the workpiece to hold it securely in position and tightly against the chuck surface. The plate 10 is rigidly held against shifting and the plate 11 is drawn forcibly toward the chuck. The plates 11, in effect, comprise the two legs of a toggle, and as the legs are brought more nearly into alignment by the magnet, the workpiece is securely clamped between them to prevent shifting due to the action of the tool such, for example, as the grinding wheel 16 indicated in Fig. 3. By means of the firm frictional engagement of the plates with the workpiece, the large vertical forces upon the former are transmitted to the latter to hold it in secure and accurate engagement with the chuck surface.

It will be noted that the chief function of the anchoring plate is the provision of an abutment or reactance member for the slanted work-engaging plate whereby shifting of the outer edge of the latter is prevented. The usual magnetic chuck has a smooth planular surface, but, in special cases, chucks could be designed with appropriate shoulders to back up the outer edge of the slanted plate, thus dispensing with the anchoring plate.

Means are provided to compensate for irregularities in the width of the workpiece. As best seen in Figs. 1 and 4, the plate 11 is provided with resilient work-engaging fingers, conveniently formed by cutting kerfs in the edge of the plate. The kerfs are made at an angle to the edge of the plate so that the fingers formed between them may be pressed inwardly slightly by the workpiece. Preferably two series of fingers are formed, those at 20 by parallel kerfs 21 slanted toward the central axis of the clamp, and those at 22 by parallel kerfs 23 also slanted toward the central axis but from the other direction. A workpiece, such as that at W in Fig. 1, is preferably held by the central regions of two of such clamps. The symmetrical forces thus applied by the four series of fingers operate to maintain the workpiece accurately in position. Minor irregularities in the workpiece merely cause varying degrees of bending of the fingers and the work is tightly clamped throughout its length.

A feature of this form of finger is illustrated in Fig. 4 where it will be noted that the undeflected fingers beyond the ends of the workpiece, as shown at 20', project into the path of the workpiece to prevent any tendency of the latter to shift in the direction of the arrow, under the influence of the grinding wheel or other tool.

Another advantage afforded by the resilient fingers is their ability to clamp a number of small workpieces simultaneously. Thus, instead of the workpiece W shown, a plurality of square blocks could be held by the two clamps and firmly retained in position despite minor irregularities between them as to size.

Provision is made for the clamping of round articles, such as the disc W' indicated in broken lines in Fig. 1. As there shown, an arcuate notch 25 may be formed in the edge of the plate 11. Two clamps will thereby have a four-point contact with the cylindrical surface of the disc and, by means of their toggle action, the clamps are adapted to hold such a workpiece securely in place. From this it will be apparent that the plate may be formed with recesses and protuberances for special application with oddly shaped workpieces.

As previously mentioned, the function of the two plates 10 and 11 may be reversed. The plate 11 may be placed flat upon the chuck and the plate 10, in its raised and idle position, may engage the workpiece and subsequently clamp it when the chuck is energized. Advantage is taken of this interchangeability by providing the plate 10 with an elastic edge so that workpieces which may be easily marred can be clamped without detriment. A groove 30 is formed in the edge of the plate and an elastic insert, such as the plastic rod 31, is cemented, crimped, or otherwise securely positioned therein.

In cases where, to prevent endwise shifting of the workpiece, a larger stop is required than that afforded by the undeflected fingers, illustrated in Fig. 4, we provide a separable element in the form of a U-shaped block, illustrated at 35 in Figs. 5 and 6. The legs 36 of the block are adapted to fit snugly in two of the kerfs of the plate 11 while the connecting portion projects beyond the edge of the plate to provide a workpiece stop, as at 37.

In Fig. 7 we have illustrated a modified form of stop means. As there shown, a swinging block 40 may be pivoted, as at 41, within a recess 42 in the plate 11. The block may be selectively positioned either to project beyond the plate 11, thus forming a workpiece stop at 43, or to lie entirely within the contour of the plate when no projection is desirable. The block may be retained in either of the two positions by means of a spring pressed detent 44 in coaction with either of two indentations 45 in the block. A similar selectively positionable block 46 may be provided in the plate 10 and thus be available as a stop when that plate is in use as a workpiece clamping member.

In the embodiment shown in Figs. 8 and 9, our invention takes the form of a unitary piece of sheet iron or sheet steel, which, in the case of a round workpiece W", may conveniently comprise a disc 50 having a round central opening at 51. A plurality of slits 52 lead from the opening and terminate a substantial distance from the periphery, leaving a flat annular region 53. The opening 51 in the disc is slightly smaller than the workpiece to be held so that the fingers 54, formed by the slits, are bent from the plane of the peripheral region when the device is pressed down upon the workpiece.

When the peripheral region 53 is laid flat upon the chuck 15, with the workpiece also contacting the chuck, the fingers stand at an angle to the chuck surface. When the chuck is energized the fingers are drawn forcibly to it, and in thus reducing the opening between them, grip the workpiece securely. The pull of the magnetic chuck upon the fingers is augumented by the restoring forces due to the resiliency of the material in returning the device to its undeformed configuration. The flat peripheral region 53 is firmly held by the chuck to prevent shifting of the device and workpiece.

If desired the fingers 54 may be initially bent from the plane of the disc, to the form shown in Fig. 9, to provide a central opening into which a workpiece may be easily set.

It will be noted that all of the elements of our clamp, illustrated in Figs. 1 to 7, may be conveniently formed of stock no thicker than approximately one-sixteenth of an inch, while the device of Figs. 8 and 9 may be considerably thinner. By means of our invention, therefore, we have provided clamps for non-ferrous workpieces which have heretofore been considered too thin for practicable machining.

While we have illustrated specific embodiments of our invention, we do not intend to be limited thereby as it will be apparent that numerous changes and modifications may be made within the spirit and scope of our invention.

We claim:

1. A device for clamping a workpiece upon a magnetic chuck comprising, a member of magnetic material adapted to be securely held on the face of the chuck by the magnetic action of the chuck, a second member of magnetic material pivotally secured by the first member against shifting parallel with the surface of the chuck, said second member normally standing at an angle to the surface of the chuck and in engagement with the workpiece but adapted to be drawn by the chuck to exert a thrust against the workpiece.

2. A device for clamping a workpiece upon a magnetic chuck comprising, two plates of magnetic material, and a resilient strip rigidly secured to and hingedly interconnecting the plates, whereby one of said plates may rest flat upon the chuck while the other stands at an angle against the workpiece and whereby when the chuck is energized the said one plate may be rigidly held by the chuck while the said other plate is drawn toward the chuck to exert a thrust against the workpiece.

3. A device for clamping a workpiece upon a magnetic chuck comprising, a plate of magnetic material, an edge on the plate adapted to engage the workpiece, a series of parallel kerfs formed in the edge, the kerf's being at an angle with said edge to form oblique fingers, a second edge on said plate normally standing nearer than the first-named edge to the chuck, and means for preventing shifting of the second edge parallel with the surface of the chuck, whereby the plate when drawn by the chuck may thrust the said fingers against the workpiece.

4. A device for clamping a workpiece upon a magnetic chuck comprising, a plate of magnetic material adapted to be securely held by the chuck, a strip of resilient material secured to the plate, a second plate of magnetic material secured to the strip at an angle to the first-named plate and adapted to engage the side of the workpiece and to be drawn toward the chuck against the action of the resilient strip, and a plurality of resilient fingers on the second plate adapted to thrust against the workpiece as the plate is drawn by the chuck.

5. A device for clamping a workpiece upon a magnetic chuck comprising, a plate of magnetic material adapted to be securely held by the chuck, a second plate of magnetic material pivotally restrained by the first plate against shifting parallel to the surface of the chuck, a recess in said second plate adapted to partially surround the workpiece, the second plate normally standing at an angle with the chuck when the chuck is de-energized and adapted to pivot upon the first plate and grip the workpiece when the chuck is energized.

6. A device for clamping a workpiece upon a magnetic chuck comprising, a plate of magnetic material adapted to be securely held by the chuck, a second plate of magnetic material adapted to be drawn toward the chuck and pivotally restrained by the first plate against shifting parallel with the surface of the chuck, said second plate normally standing at an angle with the chuck and in engagement with a side of the workpiece and adapted to exert a thrust against the workpiece when the chuck is energized, and a selectively extendable shoulder on the second plate to prevent shifting of the workpiece normal to the direction of the thrust.

7. A device for clamping a workpiece upon a magnetic chuck comprising, a plate of magnetic material adapted to be securely held by the chuck, a second plate of magnetic material, an edge on said second plate pivotally secured to the first plate, a second edge on the second plate normally farther than the first edge from the chuck and adapted to engage a side of the workpiece, whereby the second plate may be swung toward the chuck when the chuck is energized to clamp the said second edge against the workpiece, a series of kerfs in said second edge, a stop member, legs on the stop member insertable in said kerfs, and a portion connecting the legs beyond the second edge, whereby the said stop member may prevent shifting of the workpiece parallel to the second edge.

8. A device for clamping a workpiece upon a magnetic chuck comprising, a sheet of magnetic material having an opening therein, a flat peripheral region of said sheet adapted to lie upon the chuck and held in place thereon solely by the magnetic action of the chuck, opposing fingers arising from the peripheral region and extending to the opening, the fingers being adapted to engage lateral edges of the workpiece when bent from the plane of the peripheral region and to grip the workpiece tightly when drawn by the magnetic chuck toward the plane of the peripheral region.

9. A device for clamping a workpiece upon a magnetic chuck comprising, a plate of magnetic material adapted to be securely held by the magnetic action of the chuck, a second plate of magnetic material, means pivotally connecting adjacent edges of said plates, a second edge on the second plate adapted to engage the workpiece, the second edge normally being farther than the first edge from the chuck, whereby when the chuck is energized and attracts the second plate a thrust is exerted upon the workpiece parallel to the surface of the chuck.

10. A device for clamping a workpiece upon a magnetic chuck comprising, a plate of magnetic material, an edge on said plate, means to prevent shifting of said edge parallel with the surface of the chuck, a second edge on the plate adapted to engage a side of the workpiece and normally being farther than the first edge from the chuck, whereby when the chuck is energized and attracts the second plate a thrust is exerted upon the workpiece parallel to the surface of the chuck, a recess in said second edge, a block of no greater length than the depth of the recess and so pivoted therein that in one position it may be housed within the recess and in another position may project beyond the said second edge to prevent shifting of the workpiece parallel with the second edge.

JOHN E. GILES.
PETER V. REYNOLDS.

REFERENCES CITED

The following references are of record in the file of this patent:

UNITED STATES PATENTS

| Number | Name | Date |
|---|---|---|
| 1,146,867 | Griffith | July 20, 1915 |
| 1,523,770 | Hanson | Jan. 20, 1925 |
| 1,705,643 | Okochi et al. | Mar. 19, 1929 |